(12) United States Patent
Beyer et al.

(10) Patent No.: US 7,478,742 B2
(45) Date of Patent: Jan. 20, 2009

(54) METHOD FOR BRAZING CERAMIC SURFACES

(75) Inventors: Steffen Beyer, München (DE); Stephan Schmidt, Dachau (DE); Jan Hauptmann, Dresden (DE); Gunter Kirchhoff, Dresden (DE); Erich Lugscheider, Aachen (DE)

(73) Assignee: EADS SPACE Transportation GmbH, Bremen (DE)

( * ) Notice: Subject to any disclaimer, the term of this patent is extended or adjusted under 35 U.S.C. 154(b) by 432 days.

(21) Appl. No.: 10/964,643

(22) Filed: Oct. 15, 2004

(65) Prior Publication Data
US 2005/0145679 A1 Jul. 7, 2005

(30) Foreign Application Priority Data
Oct. 17, 2003 (DE) ............................. 103 49 137
Nov. 27, 2003 (DE) ............................. 103 55 983

(51) Int. Cl.
*B23K 31/02* (2006.01)
(52) U.S. Cl. .................. 228/121; 228/122.1; 228/165
(58) Field of Classification Search .................. None
See application file for complete search history.

(56) References Cited

U.S. PATENT DOCUMENTS 4,111,572 A  9/1978  Noone et al.
4,591,401 A  5/1986  Neidig et al.
5,160,090 A * 11/1992  Friedrich et al. ............ 228/121
5,744,252 A  4/1998  Rasky et al.

FOREIGN PATENT DOCUMENTS

| | | |
|---|---|---|
| DE | 2806761 | 9/1978 |
| DE | 3323830 A1 | 1/1985 |
| DE | 3801958 | 8/1988 |
| EP | 0476772 | 3/1992 |
| EP | 0476772 | 8/1993 |
| GB | 2099742 | 12/1982 |

OTHER PUBLICATIONS

English Langage Abstract of DE 3801958, no date avail.

* cited by examiner

*Primary Examiner*—Kiley Stoner
(74) *Attorney, Agent, or Firm*—Greenblum & Bernstein, P.L.C.

(57) ABSTRACT

A method for producing a brazed joint having at least one of a metal/ceramic joint and a ceramic/ceramic joint. The method includes forming bores in at least one ceramic surface to be brazed, and the bores have an average diameter of greater than 550 μm. The instant abstract is neither intended to define the invention disclosed in this specification nor intended to limit the scope of the invention in any way.

22 Claims, 4 Drawing Sheets

METHOD FOR BRAZING CERAMIC SURFACES

CROSS-REFERENCE TO RELATED APPLICATIONS

The present application claims priority under 35 U.S.C. §119 of German Patent Application No. 10349137.6, filed on Oct. 17, 2003, and German Patent Application No. 10355983.3, filed on Nov. 27, 2003, the disclosures of which are expressly incorporated by reference herein in their entireties.

BACKGROUND OF THE INVENTION

1. Field of the Invention

The present invention relates to a method of brazing ceramic surfaces, in particular a method for producing a brazed joint with metal/ceramic joints or ceramic/ceramic joints, whereby at least one of the ceramic surfaces to be brazed is structured before brazing by the insertion of bores.

2. Discussion of Background Information

A method for producing a brazed joint with metal/ceramic composite materials or ceramic/ceramic composite materials is already known from EP 0 476 772, whereby before brazing at least one of the ceramic surfaces to be brazed is structured before brazing with the aid of a laser by the insertion of conical bores with uniform diameter, uniform depth and with uniform spacing between the bores. The bores thereby feature an average diameter in the range of 50 µm to 500 µm and a depth in the range of 100 µm to 2 mm. However, this method has certain disadvantages, which will be explained in detail below.

An important influencing factor for the usability of ceramic/ceramic joints or metal/ceramic joints is a mechanically good substance-locking joint between the individual components and in many cases one that is resistant to high temperatures. Since the materials to be joined often have very different coefficients of thermal expansion, induced stress conditions occur after the joining process and during stressing which impair, and in extreme cases even destroy, the strength of the joint zone.

In order to optimize the strength of such a joint zone, in particular the surface of the ceramic material can be enlarged. This can be achieved by surface structuring, such as inserting grooves or channels by mechanical processing. However, this measure is not always sufficient to ensure sufficient strength of the brazed joint. No significant increase in strength can be observed, either, through enlarging the brazed surface by the insertion of through bores with inserted grooves on the ceramic surface, due to the low number of bores and the bore dimensions. Inserting non-through bores in ceramic material has proven to be more advantageous and can also be used in particular within the scope of the present invention.

The method of EP 0 476 772 is disadvantageous on the one hand because with the dimensions given there the structuring expenditure is very high and there is a danger that due to the selected dimensions an adequate filling of the bores with brazing material cannot always be guaranteed. In particular for fiber-reinforced ceramics with a two-dimensional layer structure of the fibers, thus with a typical laminate structure, a further problem results that during stress the shearing strains in the laminate become too high and the fiber-reinforced ceramic component fails in an interlaminar manner. This can be prevented only to a limited extent by the layout of the bores given in EP 0 476 772.

SUMMARY OF THE INVENTION

One aspect of the present invention is to overcome the disadvantages of the prior art and to provide an improved method for producing a brazed joint with metal/ceramic joints or ceramic/ceramic joints.

A first aspect of the invention relates to a method for producing a brazed joint with metal/ceramic joints or ceramic/ceramic joints, whereby at least one of the ceramic surfaces to be brazed is structured by the insertion of bores before brazing. According to the invention, it is provided with this first subject that the bores have an average diameter greater than 550 µm, preferably greater than or equal to 600 µm. The bores thus have a much greater diameter than those according to the prior art. The disadvantages of the structuring expenditure and the filling with brazing material can thus be overcome.

In combination with this aspect of the invention or alternatively to this aspect of the invention, it can be provided that at least two classes of bores are inserted, whereby the bores of one class differ from those of another class at least in bore geometry, bore diameter or bore depth. The structuring and filling can thereby be simplified at least for some of the bores, since the corresponding parameters can be selected for at least one class such that the desired advantages ensue. The other special feature of this subject of the invention lies in the possibility of providing an alternating bore depth, so that in the particular case of a two-dimensional fiber-reinforced ceramic material any stresses that might occur are distributed in different laminate layers. The acting deformation energy is thus effectively dissipated. Through this technical measure, the coupling of layers near to the surface and layers far from the surface can be thus created in the fiber-reinforced ceramic joint.

In particular at least one bore of a first class and at least one bore of a second class are inserted in the form of a geometric group. Bores are therefore not just arranged equipartitioned and at a uniform spacing from one another, instead a geometric grouping of a certain number of bores respectively is made, whereby these groupings are then repeated distributed over the surface to be structured. All geometric groups can thereby have an identical geometric structure or several geometric groups of different geometric structure can be repeated distributed over the surface. It can thereby be provided in particular that the spacing of the bores within a geometric group is smaller than the spacing of the geometric centers of two geometric groups. The spacing of the bores thereby always means the spacing of the bore centers with respect to one another.

In particular, a method according to the invention can be used to produce a brazed joint to a ceramic material with a laminate structure of several layers. According to the invention, it is thereby provided that the bores are inserted with a bore depth that is greater than the thickness of the outermost laminate layer. It can thus be achieved that after brazing, the loads occurring are distributed to more than one laminate layer and a force is introduced into deeper layers of the ceramic material. This is in particular advantageous for absorbing shearing stresses on the ceramic material. With such a method, in particular a delamination of the outermost laminate layer by outside forces can be avoided.

This method can be used, e.g., to produce a brazed joint to a fiber-reinforced ceramic material that has a laminate structure of several layers with different, periodically recurring fiber orientation. According to the invention, it is provided here that the bores are inserted with a bore depth that is equal to or greater than the spacing from the surface of the ceramic material to the layer of the laminate structure that has the same fiber orientation as the uppermost layer of the laminate structure. Since the fibers according to their orientation in the fiber longitudinal direction have a particularly high capacity for force absorption or load absorption within the ceramic material, through this measure it is achieved that a load absorption occurs in an optimized manner in all orientation directions of the fibers and thus as far as possible two-dimensionally. The outer loads or forces are thereby transmitted in turn through the bores filled with brazing material to the corresponding laminate layers.

A method according to the invention can also be used for producing a brazed joint to a fiber-reinforced ceramic material such that the spacing of the bores is at least the bore diameter plus 5 times, in particular plus at least 10 times, preferably plus at least 25 times the diameter of a fiber of the fiber-reinforced ceramic material. Here again the bore spacing means the spacing of the bore centers. The spacing of adjacent edges of the bores is consequently only 5 times, 10 times or 25 times the diameter of a fiber. Through this measure, it is guaranteed that a relatively large number of undamaged fibers always remains between two bores so that the laminate structure features a relatively high strength due to the remaining number of intact fibers.

In particular it can be provided that the number of bores, bore diameter and bore geometry are selected so that through the bores the surface area of the ceramic surface and/or each cross-sectional surface through the ceramic material is reduced by a maximum of 50%, in particular by a maximum of 25% with respect to an identical body without bores. The bores cause a reduction of the material-filled volume of the ceramic material and thus a structural weakening of the material. Through this measure, a continued good stability of the ceramic material can be guaranteed.

A particularly favorable embodiment of the invention provides that the spacing between the bores is between 50% and 150%, in particular between 75% and 125% of one of the bore depths. In this case the spacing of the bores is thus in the order of magnitude of one of the bore depths or essentially equal to one of the bore depths.

In principle, after the structuring of the surface to be brazed, a brazing material can be applied directly onto the corresponding surface according to one of the known processes from the prior art. A further development of the invention provides that after the structuring of the surface to be brazed, a flexible molded body that contains at least brazing material is applied to the structured surface. Such flexible molded bodies are fundamentally known from the prior art, e.g., from DE 38 01 958. With such form bodies on the one hand greater structural distances between the elements to be brazed can be bridged, and on the other hand after brazing the molded body also causes a certain equalization of different thermomechanical properties of the brazed materials.

Another subject matter of the invention is a method for producing a rocket engine from ceramic elements or ceramic elements and metal elements, whereby at least some of the elements are joined according to a method described above for producing a brazed joint. In principle, any elements of the rocket engine can thereby be joined according to such a method, e.g., elements of a rocket combustion chamber among themselves, elements of a rocket nozzle among themselves or elements of an injection head among themselves. Joints can also be created between the injection head and rocket combustion chamber or the rocket combustion chamber and rocket nozzle or between corresponding elements of these components according to such a method.

One aspect of the invention includes a method for producing a brazed joint having at least one of a metal/ceramic joint and a ceramic/ceramic joint. The method includes forming bores in at least one ceramic surface to be brazed, and the bores have an average diameter of greater than 550 μm.

In a further aspect of the invention, at least two classes of bores can be formed and the bores of one class differ from the bores of another class at least in one of bore geometry, bore diameter, and bore depth. Moreover, at least one bore of a first class and at least one bore of a second class can form a geometric group. Additionally, the method can include forming a plurality of the geometric groups, and a spacing of the bores within each geometric group is smaller than a spacing between geometric centers of two geometric groups. Furthermore, the method can include producing a brazed joint with a ceramic material having a laminate structure of several layers, and the bores are formed with a bore depth that is greater than a thickness of an outermost laminate layer. Moreover, the method can include producing a brazed joint with a fiber-reinforced ceramic material with a laminate structure of several layers with different periodically recurring fiber orientation, and the bores are formed with a bore depth that is equal to or greater than a spacing from the surface of the ceramic material to the layer of the laminate structure that has the same fiber orientation as an uppermost layer of the laminate structure. Additionally, the method can include producing a brazed joint with a fiber-reinforced ceramic material, and a spacing between the bores is at least a bore diameter plus 5 times a diameter of a fiber of the fiber-reinforced ceramic material. Moreover, the method can include producing a brazed joint with a fiber-reinforced ceramic material, and a spacing between the bores is at least a bore diameter plus at least 10 times a diameter of a fiber of the fiber-reinforced ceramic material. Furthermore, the method can include producing a brazed joint with a fiber-reinforced ceramic material, and a spacing between the bores is at least a bore diameter plus at least 25 times a diameter of a fiber of the fiber-reinforced ceramic material. Moreover, the method can include selecting a number of bores, bore diameter, and bore geometry such that a least one of the surface area of the ceramic surface and a cross-sectional surface through the ceramic material is reduced by a maximum of 50% by the bores. Furthermore, a spacing between the bores can be between 50% and 150% of one of the bore depths. Additionally, a spacing between the bores can be between 75% and 125% of one of the bore depths. Moreover, the method can include applying a flexible molded body that contains at least brazing material to the structured surface. Furthermore, a method of producing a rocket engine from at least one of ceramic elements and metal elements, wherein at least one of the elements can be joined according to the method for producing a brazed joint noted above.

Yet another aspect of the invention includes a method for producing a brazed joint having at least one of a metal/ceramic joint and a ceramic/ceramic joint. The method includes forming bores in at least one ceramic surface to be brazed, and at least two classes of bores are formed and the bores of one class differ from the bores of another class at least in one of bore geometry, bore diameter, and bore depth.

In a further aspect of the invention, the bores can have an average diameter greater than 550 μm.

Another aspect of the invention includes a process for producing a brazed joint. The process includes brazing a first component to a portion of a second ceramic component having bores with an average diameter of greater than 550 μm.

In a further aspect of the invention, at least two classes of bores can be formed and the bores of one class differ from the bores of another class at least in one of bore geometry, bore diameter, and bore depth.

Another aspect of the invention includes a process for producing a brazed joint. The process includes brazing a first component to a portion of a second ceramic component having bores composed of at least two classes of bores, in which the bores of one class differ from the bores of another class at least in one of bore geometry, bore diameter, and bore depth.

In a further aspect of the invention, the bores can have an average diameter greater than 550 µm.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

There is growing interest in components made of ceramic, in particular fiber-reinforced ceramic, because of ceramic's excellent technical properties, and they are finding ever-increasing fields of use. The advantage in particular of fiber-reinforced high-performance ceramics lies in fiber-reinforced high-performance ceramic's excellent wear resistance, high temperature resistance, corrosion resistance, and low specific weight.

Metal/ceramic joints make it possible to combine the advantages of metal and ceramic materials. This requires suitable joining methods. Brazing represents one possibility of joining metal and ceramic. This substance-locking joint method renders possible vacuum-tight joints that are resistant to high temperatures and have high strength. It is also characterized by its good suitability for large-scale production and for components with many joint sites that are difficult to access.

There is the problem here that ceramics are not wetted by conventional brazing due to the different atomic bond of ceramic and brazing material. Only through the use of active elements (e.g., Ti, Hf, Zr) can a joint be realized via a reaction zone at the metal/ceramic interface transition.

Two procedural principles exist for brazing metal with ceramic and ceramic with ceramic, including: brazing metallized ceramic; and active brazing.

When metallized monolithic ceramic is brazed, the joint surface of the ceramic component is coated with a metal so that subsequently in the brazing process the wetting of the ceramic joint partner by conventional brazing materials is rendered possible. A great selection of brazing materials and brazing methods is thus available that can be adapted to the individual case. The brazing material can thereby be applied in a ductile manner at as low a brazing temperature as possible in order to minimize the inherent thermal strains that inevitably occur when brazing metal and ceramic.

However, brazed joints that are resistant to high temperatures are also possible through brazing metallized ceramic. Since the active element is already on the surface of the ceramic at the start of the brazing process, the formation of weakening brittle phases in the brazed structure is reduced. Compared to active brazing, there is a much better flow and gap-filling capacity.

Active brazing is a direct brazing method in which the active element is directly added to the brazing material. The advantage over brazing metallized ceramic is that the expensive metallization of ceramic is omitted. However, the brazing material has to be applied directly to the joint surface, since active brazing materials have only a low flow capacity. Active brazing and brazing metallized ceramic can take place in vacuum or protective gas.

When brazing ceramics with metals there is fundamentally the problem that conventional brazing materials cannot develop a joint with ceramics. The reason lies in the different atomic bond of ceramics with their mainly ionic or covalent bonds that cannot be wetted by brazing materials with their metallic atomic bond.

Through the use of an active element, such as, e.g., titanium, it is possible to transform the ceramic surfaces such that they can be wetted by the brazing material. The main problems with producing brazed joints between ceramic and metal such as, e.g., steel are in wetting the ceramic by the brazing material as the basic condition for producing a joint and in the stresses that develop in the brazed joint due to the different thermal expansions of the joint partners involved and thus in addition to the formation of brittle phases impair the strength of the joint.

The embodiment of the brazed joint is essentially influenced by diffusion-controlled reaction mechanisms. The surface of the ceramic thereby is transformed such that it can be wetted by the brazing material, and brittle phases can develop during brazing that lead to a reduction in the strength of the brazed joint.

In the production of joints of metal and fiber-reinforced ceramics (CMC ceramic matrix composite), the difference of the thermal expansions of the different materials is the essential problem. In particular with 2D-reinforced CMC components, thus components made of a CMC composite in which a two-dimensional fiber structure is present, produced e.g., via a laminating technology, the danger is great that the shearing stresses will become too great during thermal stress and the ceramic component will fail in an interlaminar manner, i.e., in an interlayer manner at its weakest point.

The above-mentioned problems can be overcome with the present invention. In principle, all the above-mentioned technical measures can also be used within the scope of the present invention.

Figure 6:
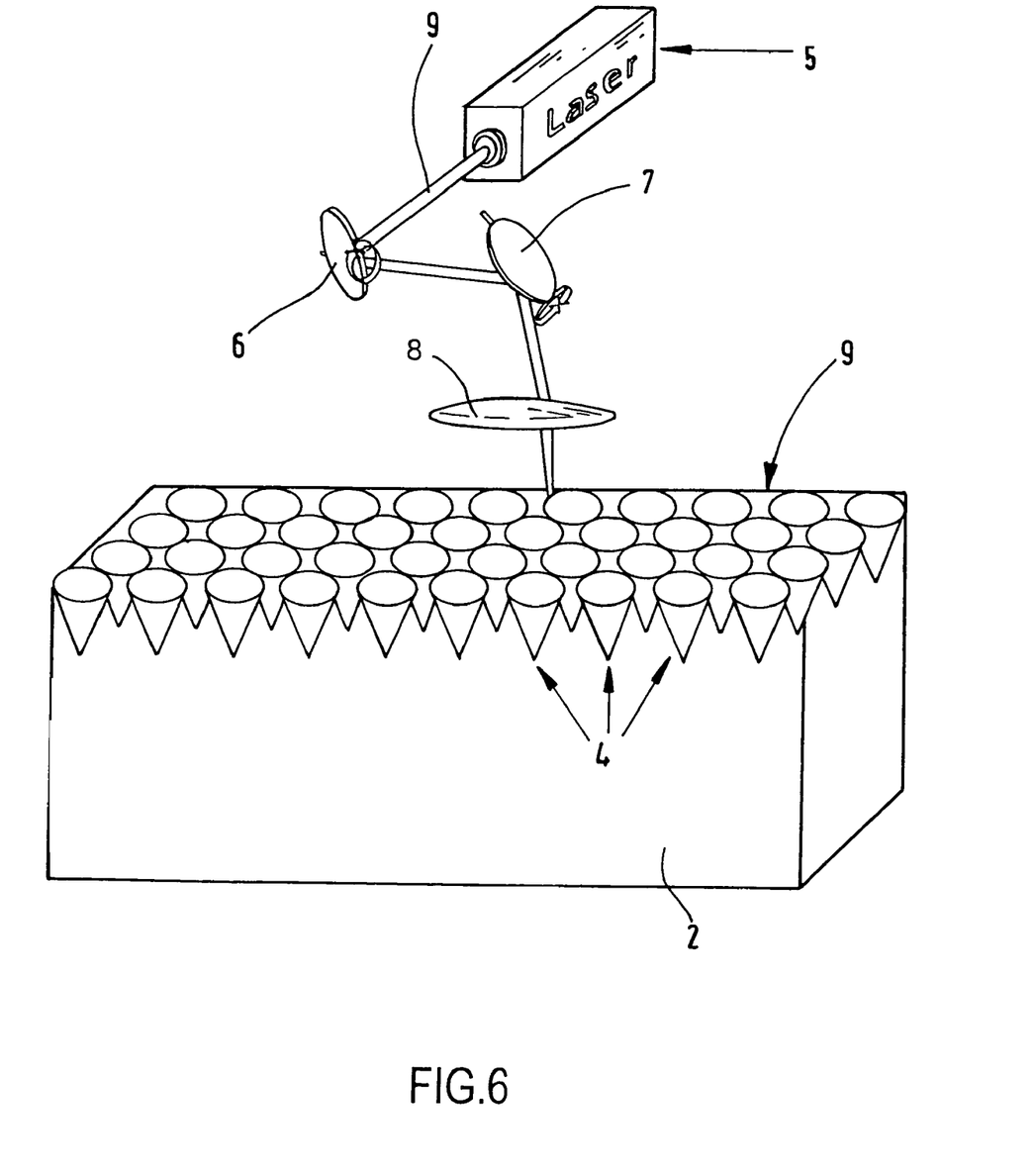
FIG. 6 shows a diagrammatic representation of the insertion of bores by lasers.

The present invention overcomes the cited disadvantages in that an adequate enlargement of the interface surface and the coupling of layers far from the surface in the ceramic material are created, in particular with uses in fiber-reinforced materials. In order to achieve this the ceramic material is structured on its surface with a defined number of bores. FIG. 6 shows an example for producing bores 4 in a ceramic material 2. For example a laser 5, e.g., an Nd:YAG laser, can be used for this. However, in principle suitable mechanical or other boring devices can also be used such as, e.g., spark erosion device. The laser beam 14 produced with a laser 5 can be deflected via an X scanner 6 and a Y scanner 7 in two spatial directions X, Y and focused with a suitable optical system 8, e.g., plane field optics, on the surface of the ceramic material 2 to be structured. The laser thereby shows the advantage that it can be used economically, in an automated manner independent of geometry.

Figures 5A, 5B:
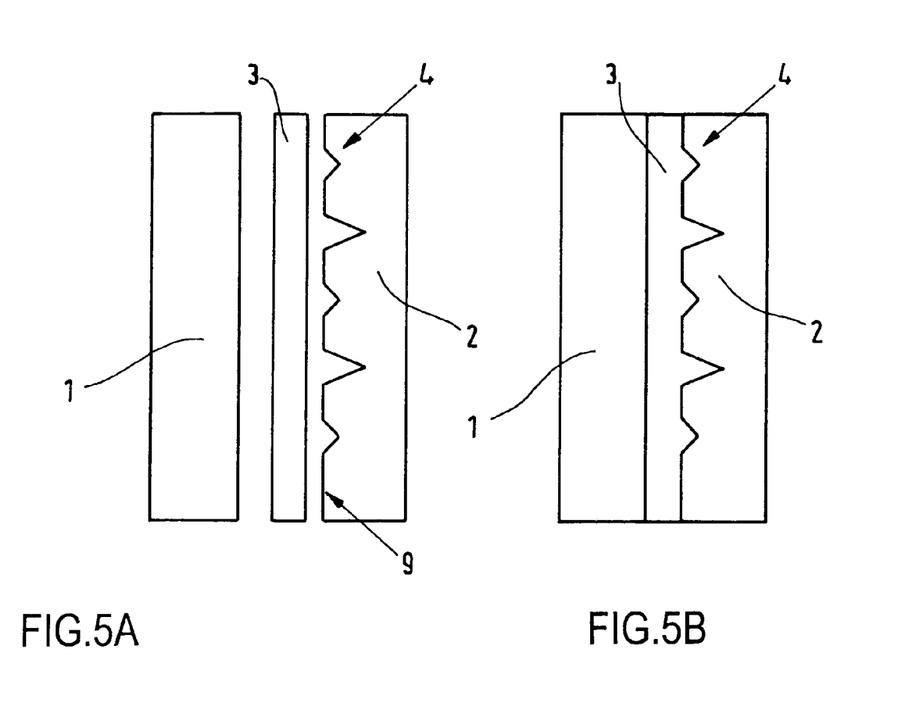
FIG. 5A and FIG. 5B show a diagrammatic representation of the production of a brazed joint with the aid of a brazing material mat.

It is now preferably provided that two classes A, B of bores are provided that have at least one alternating bore depth; i.e., a first class of bores has a uniform, apart from the usual production tolerances, first bore depth, a second class of bores has a second bore depth that is different from the first bore depth (see also FIG. 5A and FIG. 5B). Preferably the two classes A, B also have respectively a different bore diameter a, b, whereby the bore diameter within the class is uniform, apart from the usual production tolerances. Through this measure, stresses that might occur in particular with ceramic materials with laminate structure can be distributed in different laminate layers, so that the acting energy is dissipated.

EXAMPLE

|  | Preferred value | Selection range for values |
| --- | --- | --- |
| Class A: |  |  |
| Average bore diameter a: | 800 µm | 700 µm to 1000 µm |
| Bore depth: | 1.1 mm | 0.8 mm to 1.5 mm |
| Class B |  |  |
| Average bore diameter b: | 600 µm | 550 µm to 800 µm |
| Bore depth: | 0.7 mm | 0.5 mm to 0.9 mm |
| Bore spacing x | 1 to 2 mm |  |

Figure 1:
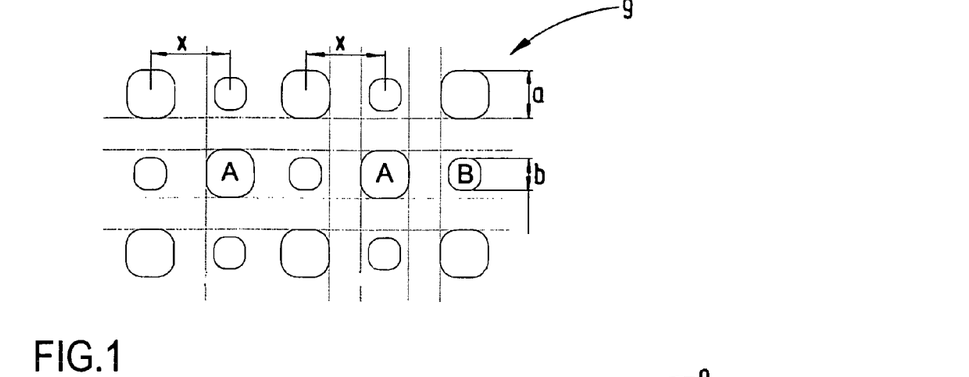
FIG. 1 shows a structured ceramic surface with two classes of bores.

Such an example is shown in FIG. 1. The average bore diameter thereby is therefore much more than 550 µm. In this example, the bores of class A and the bores of class B are respectively structured alternately into the surface 9 of a ceramic material. The geometry of the bores of class A and B is identical in this example: the bores have a cross-sectional surface that corresponds to a square with rounded corners, and the bores taper into the material, thus are embodied conically (see also FIGS. 5 and 6). However, other bore geometries are also possible. The above-mentioned values can be used for the following exemplary embodiments.

Figure 2:
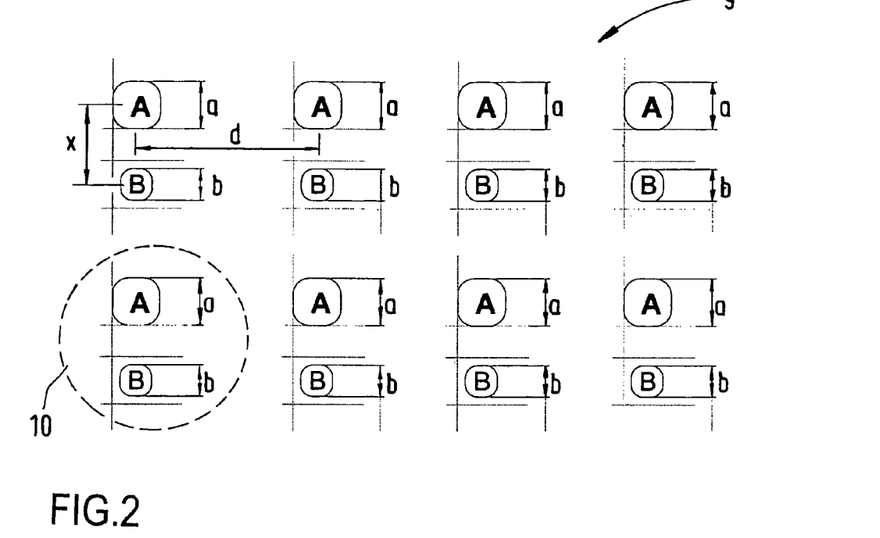
FIG. 2 shows a structured ceramic surface with a geometric group of bores.

FIG. 2 shows as an alternative exemplary embodiment a structured ceramic surface 9 that, like the example according to FIG. 1, has two classes A, B of bores with average diameters a, b. One bore each of class A and one bore of class B thereby form a geometric group 10, namely a pair of bores as the simplest possibility for a geometric group. This geometric group 10 is repeated over the ceramic surface 9. The spacing of the bores x within the geometric group 10 is smaller than the spacing d of the geometric centers of two adjacent geometric groups 10.

Figure 3:
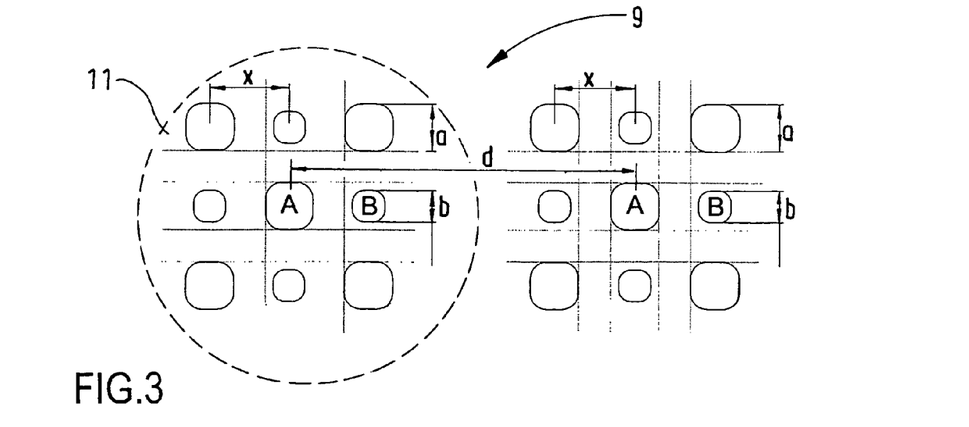
FIG. 3 shows a structured ceramic surface with a first alternative geometric group of bores.

FIG. 3 shows an exemplary embodiment with an alternative geometric group form 11, whereby respectively 5 bores of class A and 4 bores of class B are combined in a square geometric group 11 that in turn is repeated over the surface 9. Here too the spacing of the bores x within the geometric group 11 is smaller than the spacing d of the geometric centers of two adjacent geometric groups 11.

Figure 4:
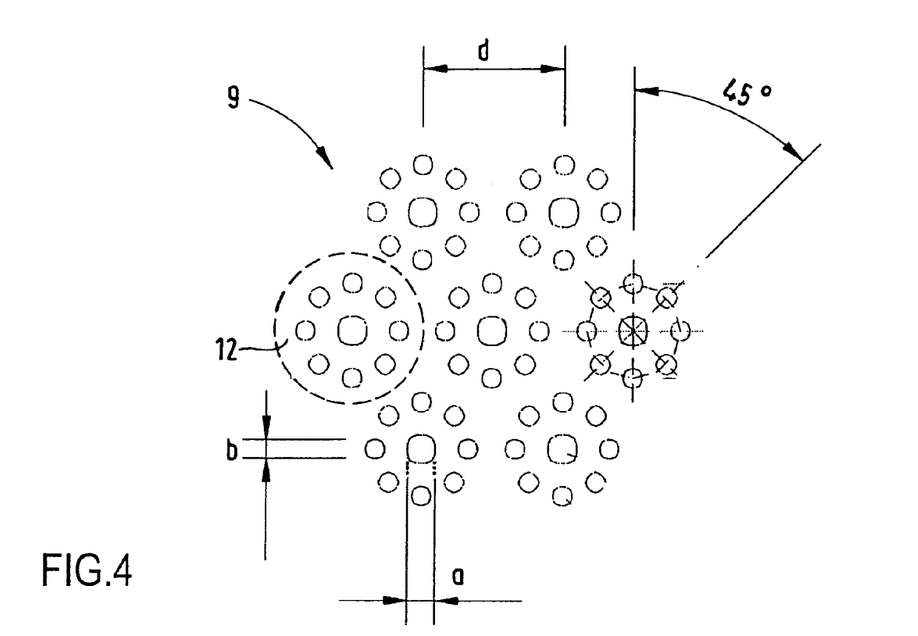
FIG. 4 shows a structured ceramic surface with a second alternative geometric group of bores.

FIG. 4 shows an exemplary embodiment with another alternative geometric group form 12, whereby respectively one bore of class A and 8 bores of class B are combined in a ring-shaped manner around the bore of the class A into a geometric group 12 that in turn is repeated over the surface 9. The spacing of the bores x in the geometric group is not shown in FIG. 4 for reasons of simplicity, but is evidently smaller than the spacing d of the geometric centers of two adjacent geometric groups 12.

In a subsequent process step it can either be provided that the perforated surface 9 is metallized by active brazing materials. Hereby the metal coating is also deposited in the bores 4. An interface develops between the ceramic material, e.g., C/SiC, and metal, in that metal needles with defined depth penetrate into the ceramic material. Foils of brazing material, for example, can be used for brazing to the metal element to be joined.

To braze larger gaps between ceramic and metal and to bridge greater differences of the thermomechanical properties of materials (differences in coefficients of temperature expansion) of the respective materials, flexible molded bodies 3 can be used which contain at least one brazing material, as shown in FIG. 5A and FIG. 5B. The molded bodies can be embodied, e.g., as mats of brazing material. In addition to brazing material, such flexible mats of brazing material can also contain materials for activating the ceramic surface, such as in particular the above-mentioned active elements. Such mats of brazing material thus offer an advantageous combination of balancing thermomechanical differences, surface activation and a simple and cost-effective brazing material application.

As FIG. 5A shows, at first a mat of brazing material 3 is applied to a structured surface 9 of a ceramic element 2. The ceramic surface 9 thereby features conical bores 4 with alternating bore depth. Subsequently a metallic element 1 is applied to the brazing material mat 3 and the two elements 1, 2 are brazed with the aid of the mat of brazing material 3. After brazing, the mat of brazing material 3 remains with a certain flexibility between the brazed elements 1, 2, whereby the bores 4 are filled up with brazing material, as shown in FIG. 5B.

Figure 7:
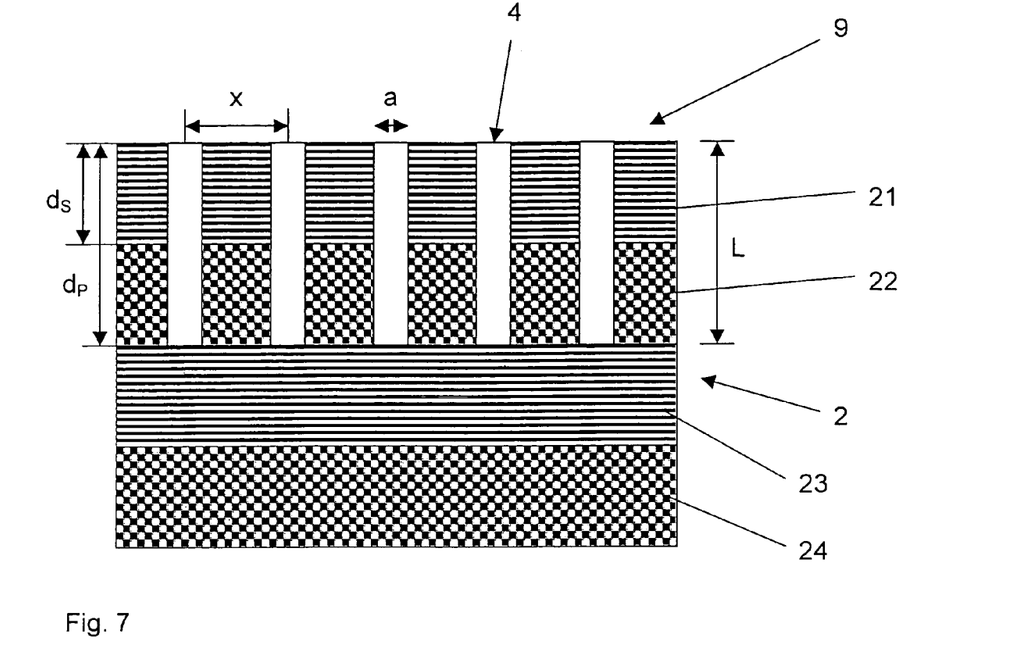
FIG. 7 shows a diagrammatic cross section through a fiber-reinforced ceramic with laminate structure and bores.

FIG. 7 shows a diagrammatic cross section through a fiber-reinforced ceramic element 2 with a laminate structure of several layers 21, 22, 23, 24, whereby the layers have a respectively different, periodically recurring fiber orientation. In layer 21 and 23 the fibers lie in the drawing plane, in layer 22 and 24 the fibers lie perpendicular to the drawing plane, as shown diagrammatically in FIG. 7. The thickness of the laminate layer 21 is labeled with $d_S$, the spacing from the surface 9 of the ceramic material to the layer 23 of the laminate material, which has the same fiber orientation as the uppermost layer 21 of the laminate structure, is labeled with $d_P$. The diameter of the fibers is typically several micrometers, e.g., between 1 and 5 µm, in particular between 2 and 4 µm.

In FIG. 7 for reasons of simplicity a cross section is shown through the ceramic material 2 in which only bores of equal size are located. The bores 4 have a spacing x (spacing of the bore centers) and a diameter a. The spacing x is thereby greater than the bore diameter a plus 5 times the diameter of a fiber, as can be seen in particular on the basis of layer 22. In layer 22 therefore at least five intact fibers lie between two bores 4.

The bores 4 in FIG. 7 have a bore depth L that is greater than the thickness $d_S$ of the outermost laminate layer 21, namely a depth L that is equal to the spacing $d_P$ from the surface 9. The corresponding advantages have already been described at the outset.

Figure 8:
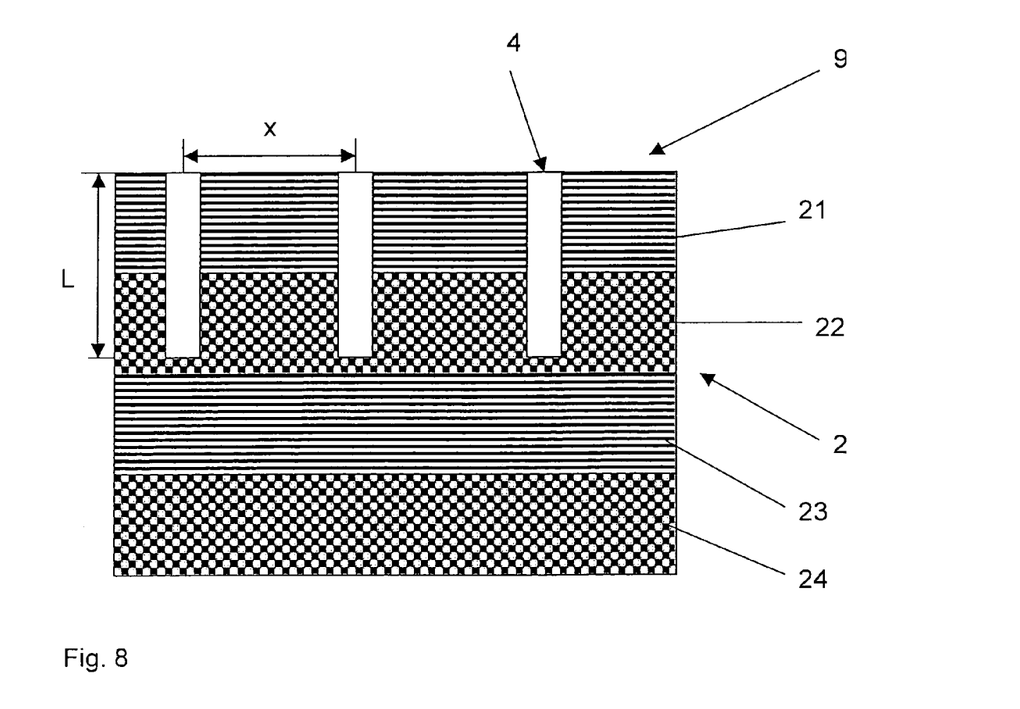
FIG. 8 shows, similar to FIG. 7, the spacing of the bores is essentially equal to the bore depth.

FIG. 8 essentially shows the same arrangement as FIG. 7, whereby the spacing x of the bores is essentially equal to the bore depth L. This time the bore depth L is smaller than the spacing $d_P$ from the surface 9, but still greater than the thickness $d_S$ of the outermost laminate layer 21. The corresponding advantages of this have also already been described at the outset.

EXAMPLE

With a bore depth L of 1.1 mm for bores of class A, as already described earlier, preferably a bore spacing x can be selected in the range from 1.0 to 1.3 mm.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for producing a brazed joint having at least one of a metal/ceramic joint and a ceramic/ceramic joint, the method comprising:
    forming bores in at least one ceramic surface to be brazed; and
    forming a brazed joint,
    wherein the bores have an average diameter of greater than 550 µm, and
    wherein at least one of:
        the bores comprise at least two classes of bores;
        the bores have an alternating bore depth; and
        the bores comprise geometric groupings of bores.

2. A method for producing a brazed joint having at least one of a metal/ceramic joint and a ceramic/ceramic joint, the method comprising:
    forming bores in at least one ceramic surface to be brazed; and
    forming a brazed joint,
    wherein the bores have an average diameter of greater than 550 µm, and
    wherein at least two classes of bores are formed and the bores of one class differ from the bores of another class at least in one of bore geometry, bore diameter, and bore depth.

3. A method for producing a brazed joint having at least one of a metal/ceramic joint and a ceramic/ceramic joint, the method comprising:
    forming bores in at least one ceramic surface to be brazed; and
    forming a brazed joint,
    wherein at least two classes of bores are formed and the bores of one class differ from the bores of another class at least in one of bore geometry, bore diameter, and bore depth.

4. The method according to claim 3,
    wherein the bores have an average diameter greater than 550 µm.

5. The method according to claim 2, wherein at least one bore of a first class and at least one bore of a second class form a geometric group.

6. The method according to claim 5 further comprising:
    forming a plurality of the geometric groups,
    wherein a spacing of the bores within each geometric group is smaller than a spacing between geometric centers of two geometric groups.

7. The method according to claim 1 further comprising:
    wherein the at least one ceramic surface is arranged on a ceramic material having a laminate structure of several layers,
    wherein the bores are formed with a bore depth that is greater than a thickness of an outermost laminate layer.

8. A method for producing a brazed joint having at least one of a metal/ceramic joint and a ceramic/ceramic joint, the method comprising:
    forming bores in at least one ceramic surface to be brazed; and
    producing a brazed joint with a fiber-reinforced ceramic material with a laminate structure of several layers with different periodically recurring fiber orientation,
    wherein the bores have an average diameter of greater than 550 µm, and
    wherein the bores are formed with a bore depth that is equal to or greater than a spacing from the surface of the ceramic material to the layer of the laminate structure that has the same fiber orientation as an uppermost layer of the laminate structure.

9. A method for producing a brazed joint having at least one of a metal/ceramic joint and a ceramic/ceramic joint, the method comprising:
    forming bores in at least one ceramic surface to be brazed; and
    producing a brazed joint with a fiber-reinforced ceramic material,
    wherein the bores have an average diameter of greater than 550 µm, and
    wherein a spacing between the bores is at least a bore diameter plus 5 times a diameter of a fiber of the fiber-reinforced ceramic material.

10. A method for producing a brazed joint having at least one of a metal/ceramic joint and a ceramic/ceramic joint, the method comprising:
    forming bores in at least one ceramic surface to be brazed; and
    producing a brazed joint with a fiber-reinforced ceramic material,
    wherein the bores have an average diameter of greater than 550 µm, and wherein a spacing between the bores is at least a bore diameter plus at least 10 times a diameter of a fiber of the fiber-reinforced ceramic material.

11. A method for producing a brazed joint having at least one of a metal/ceramic joint and a ceramic/ceramic joint, the method comprising:
   forming bores in at least one ceramic surface to be brazed; and
   producing a brazed joint with a fiber-reinforced ceramic material,
   wherein the bores have an average diameter of greater than 550 μm, and
   wherein a spacing between the bores is at least a bore diameter plus at least 25 times a diameter of a fiber of the fiber-reinforced ceramic material.

12. The method according to claim 1 further comprising:
   selecting a number of bores, bore diameter, and bore geometry such that a least one of a surface area of the at least one ceramic surface and a cross-sectional surface through a ceramic material is reduced by a maximum of 50% by the bores.

13. The method according to claim 1, wherein a spacing between the bores is between 50% and 150% of one of the bore depths.

14. The method according to claim 1, wherein a spacing between the bores is between 75% and 125% of one of the bore depths.

15. The method according to claim 1 further comprising:
   applying a flexible molded body that contains at least brazing material to the structured surface.

16. A method of producing a rocket engine from at least one of ceramic elements and metal elements, wherein at least one of the elements is joined according to the method for producing a brazed joint of claim 1.

17. A process for producing a brazed joint comprising:
   brazing a first component to a portion of a second ceramic component having bores with an average diameter of greater than 550 μm,
   wherein at least one of:
      the second ceramic component comprises a laminate structure of several layers and the bores comprise a bore depth that is greater than a thickness an outermost layer of the ceramic; and
      the second ceramic component comprises a ceramic element of a rocket engine and a center-to-center spacing of the bores is at least a bore diameter plus five times a diameter of a fiber of the ceramic.

18. A process for producing a brazed joint comprising:
   brazing a first component to a portion of a second ceramic component having bores with an average diameter of greater than 550 μm,
   wherein at least two classes of bores are formed and the bores of one class differ from the bores of another class at least in one of bore geometry, bore diameter, and bore depth.

19. A process for producing a brazed joint comprising:
   brazing a first component to a portion of a second ceramic component having bores composed of at least two classes of bores, in which the bores of one class differ from the bores of another class at least in one of bore geometry, bore diameter, and bore depth.

20. The process according to claim 19, wherein the bores have an average diameter greater than 550 μm.

21. A method for producing a brazed joint having at least one of a metal/ceramic joint and a ceramic/ceramic joint, the method comprising:
   forming bores in at least one ceramic surface to be brazed; and
   forming a brazed joint,
   wherein the bores have an average diameter of greater than 550 μm,
   wherein at least one of:
      the bores comprise at least two classes of bores;
      the bores have an alternating bore depth;
      the bores comprise geometric groupings of bores; and
      a bore spacing is between 50% and 150% of a bore depth, and
   wherein the at least one ceramic surface is arranged on a ceramic element of a rocket engine.

22. A method for producing a brazed joint having at least one of a metal/ceramic joint and a ceramic/ceramic joint, the method comprising:
   forming bores in at least one ceramic surface to be brazed; and
   forming a brazed joint,
   wherein the bores have an average diameter of greater than 550 μm,
   wherein at least one of:
      the bores comprise at least two classes of bores;
      the bores have an alternating bore depth;
      the bores comprise geometric groupings of bores; and
      a bore spacing is between 50% and 150% of a bore depth, and
   wherein a center-to-center spacing of the bores is at least a bore diameter plus five times a diameter of a fiber of the ceramic.

* * * * *